United States Patent

Ellis et al.

[15] 3,691,389

[45] Sept. 12, 1972

[54] RADIATION DETECTOR COMPRISING SEMI-CONDUCTOR BODY INCORPORATING A TWO-DIMENSIONAL ARRAY OF P-I-N-DEVICES

[72] Inventors: Ronald Ellis, 125 Cavalier Road, Basing, near Basingstoke; James Leonard Wankling, 162 Reading Rd., Wokingham, both of England

[22] Filed: June 9, 1969

[21] Appl. No.: 831,639

[52] U.S. Cl. ..........................250/211 J, 250/220 M

[51] Int. Cl. ..............................................H01j 39/12

[58] Field of Search........250/83, 83.3, 211 J, 220 M; 338/17

[56] References Cited

UNITED STATES PATENTS

| | | | |
|---|---|---|---|
| 2,911,539 | 11/1959 | Tanenbaum | 250/211 J |
| 3,529,161 | 9/1970 | Oosthoek | 250/83.3 |

*Primary Examiner*—James W. Lawrence
*Assistant Examiner*—D. C. Nelms
*Attorney*—Cushman, Darby & Cushman

[57] ABSTRACT

A radiation detector comprises a slab of semi-conductor material having a p-i-n structure with ribs formed on opposite sides of the slabs, in p-i and n-i junctions lying within the ribs. The ribs on one side of the slab are so aligned as to traverse those on the other side of the body.

5 Claims, 3 Drawing Figures

INVENTORS
RONALD ELLIS
JAMES LEONARD WANKLING
By Cushman, Darby & Cushman
ATTORNEYS INVENTORS
RONALD ELLIS
JAMES LEONARD WANKLING
By Cushman, Darby & Cushman
ATTORNEYS

RADIATION DETECTOR COMPRISING SEMI-CONDUCTOR BODY INCORPORATING A TWO-DIMENSIONAL ARRAY OF P-I-N-DEVICES

This invention relates to radiation detectors and more particularly to gamma-ray detectors suitable for use in gamma-ray cameras, to methods of producing such detectors, and to cameras employing such detectors.

It has been proposed to make a form of radiation detector comprising a plate of semi-conductor material having parallel connector strips applied to each face thereof, the plate containing an intrinsic region sandwiched between regions of opposite conductivity types and the strips on one face being aligned transverse to those on the other face, preferably at right angles. Such a detector effectively provides in a single body a dimensional array of individual p-i-n devices.

However, in such a detector it may be found that the resistivity of the semi-conductor material is insufficient to prevent interaction between one connector strip and another.

It is an object of the invention to provide an improved radiation detector.

According to the invention in one aspect there is provided a radiation detector comprising a slab of semi-conductor material having first and second regions of opposite conductivity types formed on opposite sides of the slab with an intrinsic region between them, the slab having formed in it slots which divide the respective sides of the body into parallel ribs, the ribs on one side of the slab being aligned transverse to those on the other side of the slab, the arrangement being such that the junctions between the intrinsic region and the first and second regions lie within the said ribs, and means for making electrical connection to each of the said ribs.

Preferably the ribs are so aligned that those on one side of the slab are at right angles to those on the other side of the slab.

According to the invention in another aspect, a gamma camera comprises a detector as aforesaid in which the semi-conductor material is germanium means for applying a bias voltage between the ribs on opposite sides of the slab, and circuit means operable by pulses produced by gamma rays incident on said detector to indicate at which portion of the intrinsic region a gamma ray was incident.

There is also provided a method of producing the radiation detector including the steps of finally etching and quenching the said slab in such a manner that both of the sides of the slab are exposed simultaneously to freely moving liquid. The slab may be etched and quenched in a vessel having a curved lower surface which makes point contact with the slab and thus allows free movement of liquid between the lower of said faces and the curved surface.

To enable the nature of the present invention to be more readily understood, attention is directed, by way of example, to the accompanying drawings wherein.

Figure 1:
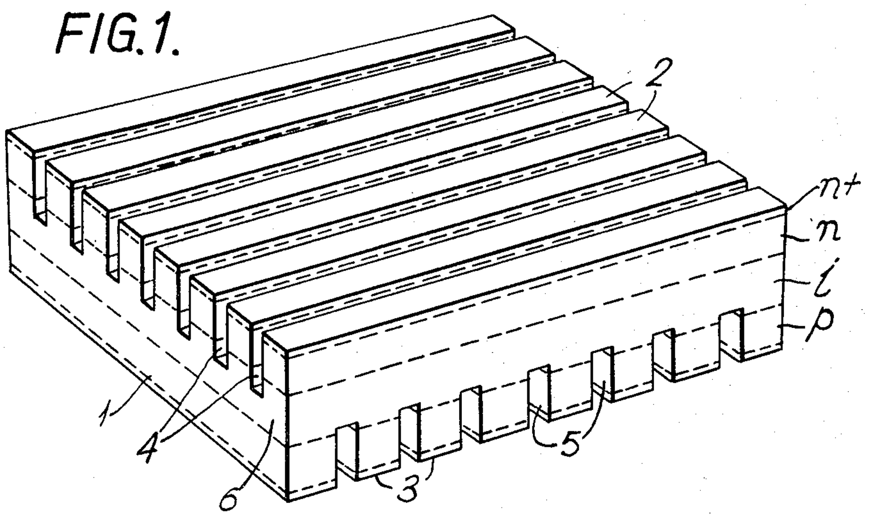
FIG. 1 is a perspective view of a gamma ray detector embodying the invention.

Referring to FIG. 1, a slab 1 initially of high purity p-type germanium which has been lithium-drifted to provide a p-i-n structure within it has opposite sides divided into ribs 2 and 3 by slots 4 and 5, such that the ribs 2 extend perpendicularly to the ribs 3. The slots 4 and 5 are of such a depth that the i-n and p-i junctions lie within the ribs 2 and 3. The surface of each of the upper ribs 2 is formed into a low resistivity region and the surface of each of the lower ribs 3, is also formed into a low resistivity region so that ohmic contacts may be made to the p and n regions of the slab 1.

The low resistivity region at the surface of the upper ribs 2 is achieved by initially doping this part of the slab 1 to a very high concentration of lithium, and the low resistivity region at the surface of each of the lower ribs 3 is formed as described below. The intrinsic region of the slab 1 is thus divided into an array of portions, each bounded by an i-n junction in one of the ribs 2 and a p-i junction in one of the ribs 3, which effectively provides an array of individual p-i-n devices.

In one example, the slab 1 is 2.3 cm. sq. and 0.5 cm. thick, the ribs 2 and 3, 2mm. wide, the slots 4, 1 mm. wide and 2 mm. deep, and the intrinsic region 2 mm. thick.

Greater counting efficiency can be obtained by increasing the thickness of the intrinsic region to, say 1 cm., giving greater absorption of the gamma rays. This requires the use of a thicker slab 1. In a second example, the slab is 4.7 cm. sq. and 1.1 cm. thick with an intrinsic region some 0.8 cm. thick. The slots 4 have the same dimensions as in the first example.

Connections may be made to the ribs 2 and 3 by using printed circuit techniques to produce gold plated contact strips on a flexible insulated base, e.g. of fiberglass or the plastics material know as KEPTON, the strips corresponding in dimensions and location to the surface of the ribs 2 and 3. Indium-gallium eutectic is applied to the ribs 2 and 3, the gold-plated contact strips are "tinned" with indium, and the latter are pressed down upon the ribs 2 and 2. The gold-plated strips are connected to terminals on the base in the normal manner. The indium gallium eutectic alloys with the p-type germanium that constitutes the lower ribs 3, thus providing the low resistivity contact with the germanium. These connections are omitted from FIG. 1 for clarity.

It is important that the contacts to the p and n type regions of the slab 1 should either be of low resistivity or at least ohmic, or should have junctions between different doping levels of such a kind that, when the device as a whole is reverse biassed, each of these junctions is forward biased. If this is not insured, a loss in gain results.

Figure 2:
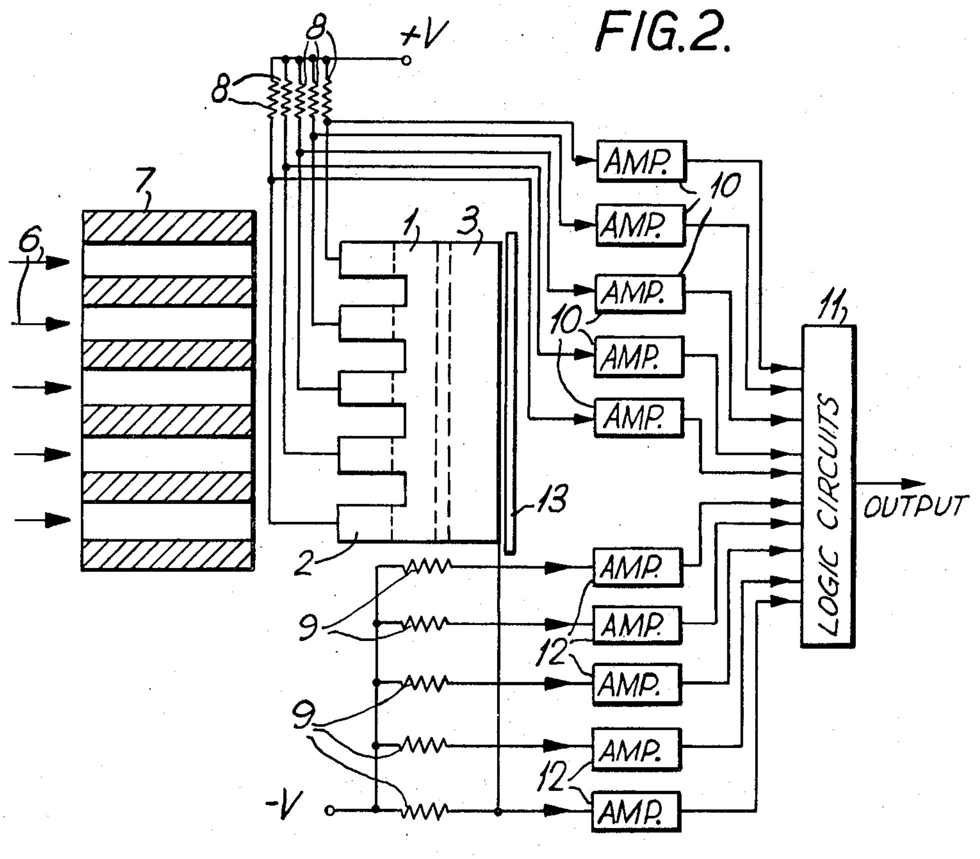
FIG. 2 is a schematic diagram of a gamma ray camera embodying the detector of FIG. 1.

FIG. 2 shows the circuit of a gamma camera employing the detector of FIG. 1. Gamma rays from a source (not shown) pass through a parallel hole collimator 7 whose square section holes are aligned on the portions of the intrinsic region referred to above. Each rib is connected to a +*ve* bias voltage via a resistor 8 and each rib 3 to a −*ve* bias voltage via a resistor 9. Each rib 2 is connected via an amplifier 10 to a logic circuit 11, and each rib 3 via an amplifier 12 to the logic circuit 11. The incidence of a gamma-ray on a given portion of the intrinsic region causes a −*ve* output pulse to be produced from the corresponding rib 2 and a +*ve* output pulse from the corresponding rib 3, simultaneously. The logic circuit 11 may be of the kind described with reference to FIG. 8 of the paper by Hofker et al published in IEEE Trans. Nucl. Sci. NS–13 (1966), 208, and its output indicates at which portion of the intrinsic region the gamma ray giving rise to the two output pulses was incident. The amplifiers 10 and 12 can be relatively low quality and thus relatively cheap.

The detector 1 is maintained at liquid nitrogen temperature by contact with a metal plate 13 cooled by contact with the liquified gas. FIG. 2 shows a space between plate 13 and the detector for clarity, but in practice it is located in contact with, though electrically insulated from, the ribs 3 and the connections thereto.

FIG. 2 shows the n-type ribs 2 directed towards the collimator 7, but the detector may be reversed so that the p-type ribs 3 are directed towards it.

The detector shown in FIG. 1 is made from monocrystalline high purity germanium, for example a Czochralski or a zone levelled single crystal ingot, having a resistivity of 10 – 30 ohm. cm. and a minority lifetime greater than 500 m$\mu$ sec. which is grown in the (111) orientation and doped with gallium to render it p-type. The dislocation density and the oxygen content are minimized to facilitate the lithium drifting which is a stage in the manufacture of the detector, and in any case the oxygen content should be less than $10^{12}$ oxygen atoms/cc.

The steps in the production of the detector are as follows:

1. From the ingot is cut a 0.5 cm. thick slice 2.3 cm. sq., using a diamond-impregnated saw.
2. Using a similar saw, the slots 5 are cut to form the ribs 3.
3. The slice is etched in a solution of HF and $HNO_3$ to remove surface damage, and cleaned ultrasonically in trichloroethylene followed by methanol.
4. A lithium-in-oil suspension is applied to the unslotted face of the slice, which has been heated to about 400°C, and the crystal is maintained at this temperature for 15 — 20 minutes so that the lithium is initially diffused into the crystal to a depth of 0.5 — 1 mm.

Contacts are made to the opposite faces of the slice and a potential is applied to reverse bias the diode structure that results from stage (4). Under the action of the applied potential, lithium ions drift through the crystal and compensate for acceptor impurities present in the crystal, to form an intrinsic region in the crystal. The rate of drift is a function of the temperature of the crystal as well as the bias potential and therefore steps must be taken to ensure that the temperature conditions are accurately controlled. One method of doing this is to carry out the drifting process in air with the crystal clamped directly between two thermo-modules and to control the temperature of the modules, via a control circuit, by the current flowing through the device so that the drifting is carried out under conditions of constant power.

5. The diffused lithium is drifted towards the slotted face until the intrinsic region is about 2 mm. thick and extends about 0.5 mm. into the ribs 3, the remainder of the initially diffused layer providing an n-type region.
6. The slots are cut in the unslotted face to form the ribs 2, whose surfaces now form the low resistivity contacts to the type region.
7. The slice is re-etched in a solution of HF and $H_2O_2$ followed by quenching in an aqueous solution of $CaCl_2$ (10 gm/liter of demineralized water) and dried in a stream of nitrogen (as described by de Witt and McKenzie, 11th Scintillation and semi-Conductor Counter Symposium, Washington, February, 1968).
8. The detector so formed is given a clean-up drift by the use of known techniques.
9. The low resistivity p-type region is formed as described and connections are applied to the ribs in the manner already described in the present specification.

As usual in the art, the cutting operations must be carried out with circumspection to ensure that the minimum of work damage to the crystals occurs.

In carrying out step (7) above, it has been found important that first the etching and then the quenching liquid should circulate freely and simultaneously over all surfaces of the detector. If, for example, these processes are carried out in an ordinary flat-bottomed beaker, the side in contact with the bottom of the beaker is denied free access to the liquids, even when these are swirled about. Even if the detector is subsequently turned upside down and the liquids swirled satisfactory results are not obtained. The surface insulation between the ribs remains insufficient to ensure low talk and low noise.

Figure 3:
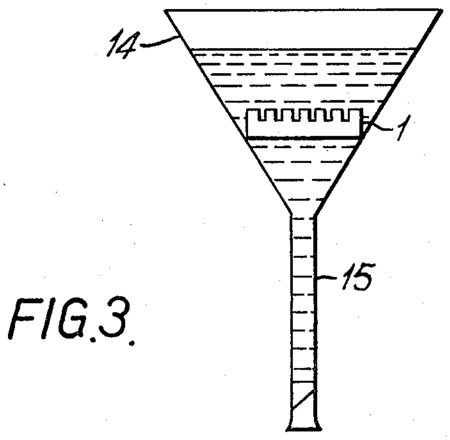
FIG. 3 is a diagram illustrating a stage in the manufacture of the detector shown in FIG. 1.

It is therefore preferred to carry out the final etching and quenching steps in a vessel having a base which is concave on the inside, which allows the detector to make only point contact therewith. For example, as shown in FIG. 3, a conical filter funnel 14 whose outlet 15 has been stoppered forms a suitable vessel, and after the quench a stream of drying nitrogen can be fed through the unstoppered outlet.

Alternatively the slab can be held in a nylon clamp that has two sets of knife edges which are so positioned as to be perpendicular to the ribs on the respective sides of she slab, and the slab and clamp can be rotated in the etch at a suitable speed, such as 10 r.p.m., by an electric motor.

We claim:

1. A radiation detector comprising:

a slab of semiconductor material having first and second regions of opposite conductivity types formed on opposite sides of the slab with an intrinsic region of semiconductor material between said first and second regions, the slab having slots formed on each side and extending into said intrinsic region but not completely through said intrinsic region thereby dividing the respective sides of the slab into parallel ribs, the ribs on one side of the slab being aligned transverse to those on the other side of the slab whereby continuous junctions are formed between the intrinsic region and the first and second regions of opposite conductivity types along the length of said ribs and within the said ribs on respectively opposite sides of said slab, and means for making electrical connection to each of the said ribs.

2. A radiation detector according to claim 1 wherein the said ribs are so aligned that those on one side of the slab are at right angles to those on the other side of the slab.

3. A radiation detector according to claim 1 wherein the slab is of germanium.

4. A gamma camera comprising a radiation detector according to claim 3 including means for applying bias voltages between the ribs on opposite sides of the slab, and circuit means operable by pulses produced by gamma rays incident on the said detector to indicate at which portion of the intrinsic region a gamma ray way incident.

5. A gamma camera according to claim 4 including means for maintaining the temperature of the detector at a predetermined low value.

* * * * *

UNITED STATES PATENT OFFICE
CERTIFICATE OF CORRECTION

Patent No. 3,691,389 Dated September 12, 1972

Inventor(s) Ronald Ellis and James Leonard Wankling

It is certified that error appears in the above-identified patent and that said Letters Patent are hereby corrected as shown below:

In the Heading: please add:

[73] Assignee: National Research Development Corporation London, England

[30] Foreign Application Priority Data:

June 12, 1968 Great Britain......28027/68

Signed and sealed this 29th day of May 1973.

(SEAL)
Attest:

EDWARD M.FLETCHER,JR.
Attesting Officer

ROBERT GOTTSCHALK
Commissioner of Patents